UNITED STATES PATENT OFFICE 2,456,213

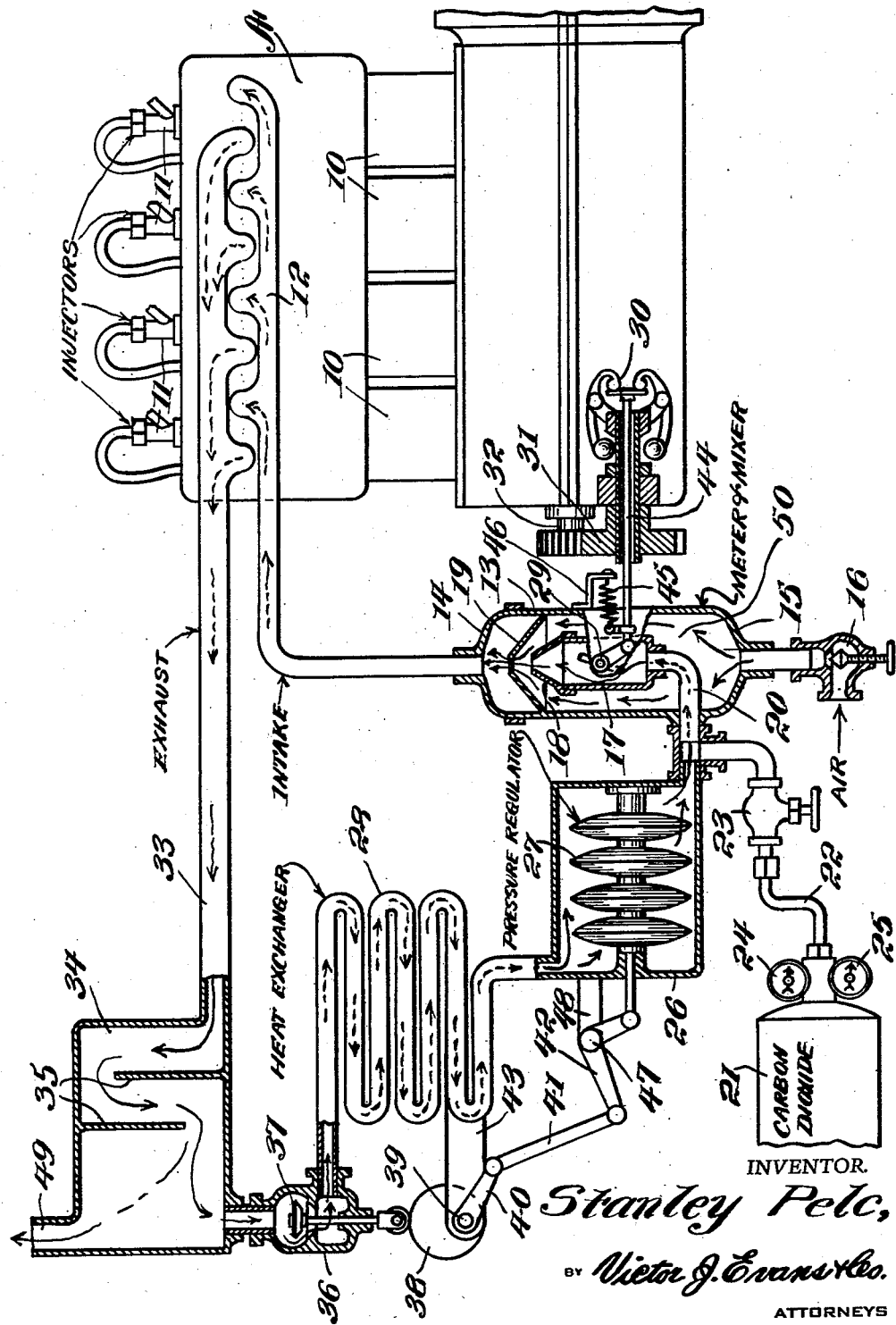

DIESEL ENGINE AIR METER

Stanley Pelc, Sharon, Pa.

Application December 28, 1944, Serial No. 570,182

5 Claims. (Cl. 123—119)

The invention relates to an air control mechanism for fluid power units and more especially to a Diesel engine metering mechanism.

The primary object of the invention is the provision of mechanism of this character, wherein the intake of air and thus oxygen into the cylinder or cylinders of a power unit will be automatically controlled, so as to assure efficient operation thereof and at the same time permitting enough volume of intake to maintain an efficient combustion pressure.

Another object of the invention is the provision of mechanism of this character, wherein the fluid power unit by admitting the exact amount of air for efficient operation, the unit will operate more smoothly, requiring less lubrication, and eliminates the burning out of valves and other parts, as well as avoids the overheating of the unit during the working thereof.

A further object of the invention is the provision of mechanism of this character, which is simple in construction, thoroughly reliable and efficient in the working thereof, strong, durable, automatic in the operation, and inexpensive to manufacture and install.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

The single figure is an elevation, partly broken away, of a Diesel engine in association with the mechanism constructed in accordance with the invention.

Referring to the drawing in detail, A designates generally a Diesel engine constituting the power unit having four cylinders 10 which have installed therewith the fuel injectors 11, of any standard construction, while involved with the intake manifold 12 of this unit is a combined meter and mixer, which is in the form of a cylindrical drum 13 having the intake manifold 12 communicating with the upper head end 14, while at the lower head end 15 is an air intake valve 16, adapted to be manually regulated.

Arranged within the drum 13 is a flow nozzle 17 having its nipple 18 directed toward a perforated baffle cone 19 within such drum and uppermost to the said nipple. This nozzle 17 is joined with a supply elbow pipe 20 carried through the lower portion of the side wall of the drum 13, and communicating with a carbon dioxide container 21 by a branch pipe 22, the latter being fitted with a hand regulated valve 23, and such container is equipped with indicators 24 and 25, which are a regulator outlet pressure gauge and cylinder pressure gauge respectively.

The pipes 20 and 22 are connected to a pressure regulator enclosure 26, having the bellows type pressure regulator 27 therein. The enclosure 26 has communication with the said pipes at the lower portion of one end, while at the upper portion of the other end of such enclosure a heat exchanger coil 28 communicates therewith. The nozzle 17 has within the same a butterfly valve 29 which is operated directly from a fly-ball governor 30, intergeared at 31 with the power shaft 32 of the unit A.

The exhaust manifold 33 of the unit A has communication with a baffle equipped exhaust muffler 34, the baffles being denoted at 35, and leading from this muffler 34 is a poppet type valve casing 36, having the poppet valve 37 working therein through the action of a lifter cam 38, the casing 36 being in communication with the heat exchanger coil 28, and the arbor 39 of the cam 38 is fitted with a turning crank 40, which through linkage 41 is connected with a bellcrank 42, the latter being controlled by the pressure regulator 27. The arbor 39 is supported on a bracket 43. The throw rod 44 of the governor 30 is in association with a tensioning spring 45, bracketed at 46 exteriorly on the drum 13. The turning axle 47 of the bell-crank 42 is carried by a hanger 48 on the enclosure 26. In the operation of the mechanism it is to be understood that regulator 27 is pressure regulated and not heat actuated. The reason for this being that the heat exchanger 28 cools the exhaust gas before it enters the regulator 27.

Thus when the exhaust gas enters the heat exchanger coil 28 where the temperature is of the exhaust gas cooled by the coil 28 depending on the atmospheric conditions existing at the time of operation of the device. From the coil 28 the heated gases pass to the heat actuated pressure regulator. When the engine is under full load, little if any, exhaust gas will be needed in the meter and mixer, but at such a time the exhaust gas in the chamber 34 will be at its greatest pressure. When the engine is under a light load or idling, little oxygen and a large amount of exhaust gas will be required, but at such a time the gas in the chamber 34 will be under much less pressure. Thus when the pressure in the chamber 26 drops, the pressure regulator 27 will open the valve 37, since the opening of valve 29 will operate the regulator 27. When the pressure has been built up again in the chamber 26 by the exhaust gas from chamber 34, the regulator will close the valve 37. Thus, with the pressure in the chamber 26 controlled by the valve 29, it is maintained at a fairly constant pressure and the exhaust gas admitted into the chamber 50 will be in proportion to the opening of the valve 29 regardless of the variations of the exhaust gas pressure in the chamber 34. Pressure at the valve 37 on the upper side thereof is maintained constant by means of the pressure regulator in proportion to the intake of fuel into the motor, therefore as the intake of fuel decreases and the pressure on the head of the valve 37 decreases due to the natural fall of exhaust pressure, the pressure regulator will operate to rotate the cam 38 to permit the exhaust gas to enter the heat exchange coil. The gas and air are mixed thoroughly in the chamber 50 formed by the drum 13. The correct amount of exhaust gas, for the most efficient operation, is admitted by the valve 29 which is controlled by the governor 30 should the exhaust gas be found undesirable for efficient operation carbon dioxide gas stored in tank 21 can be admitted into the meter and mixer in lieu of the exhaust gas. By admitting the exact amount of air for the efficient operation of the unit A, it will operate more smoothly, less lubrication oil will be consumed, and the valves and other parts will not have a tendency to burn out as where there is an excess of oxygen.

What is claimed is:

1. A metering mechanism of the kind described, comprising a drum forming a metering chamber, means connecting the drum to the intake manifold of a fluid power unit, means for admitting air to the chamber, a flow nozzle within the chamber and having a governor controlled valve therein, a carbon-dioxide container communicating with the nozzle, a pressure regulating enclosure communicating with the nozzle, a pressure regulator within the enclosure, a heat exchanger communicating with the enclosure, and having communication with an exhaust manifold of the power unit, and means controlled by the regulator for the last named communication.

2. A metering mechanism of the kind described, comprising a drum forming a metering chamber, means connecting the drum to the intake manifold of a fluid power unit, means for admitting air to the chamber, a flow nozzle within the chamber and having a governor controlled valve therein, a carbon-dioxide container communicating with the nozzle, a pressure regulating enclosure communicating with the nozzle, a pressure regulator within the enclosure, a heat exchanger communicating with the enclosure, and having communication with an exhaust manifold of the power unit, means controlled by the regulator for the last named communication, a valve included in the last named means, and a lifter cam operating the valve.

3. A metering mechanism of the kind described, comprising a drum forming a metering chamber, means connecting the drum to the intake manifold of a fluid power unit, means for admitting air to the chamber, a flow nozzle within the chamber and having a governor controlled valve therein, a carbon-dioxide container communicating with the nozzle, a pressure regulating enclosure communicating with the nozzle, a pressure regulator within the enclosure, a heat exchanger communicating with the enclosure, and having communication with an exhaust manifold of the power unit, means controlled by the regulator for the last named communication, a valve included in the last named means, a lifter cam operating the valve and means for regulating the communication between the container and the nozzle.

4. A metering mechanism of the kind described, comprising a drum forming a metering chamber, means connecting the drum to the intake manifold of a fluid power unit, means for admitting air to the chamber, a flow nozzle within the chamber and having a governor controlled valve therein, a carbon-dioxide container communicating with the nozzle, a pressure regulating enclosure communicating with the nozzle, a pressure regulator within the enclosure, a heat exchanger communicating with the enclosure, and having communication with an exhaust manifold of the power unit, means controlled by the regulator for the last named communication, a valve included in the last named means, a lifter cam operating the valve, means for regulating the communication between the container and the nozzle and a driving connection governor controlled between the valve and the governor.

5. A metering mechanism of the kind described, comprising a drum forming a metering chamber, means connecting the drum to the intake manifold of a fluid power unit, means for admitting air to the chamber, a flow nozzle within the chamber and having a governor controlled valve therein, a carbon-dioxide container communicating with the nozzle, a pressure regulating enclosure communicating with the nozzle, a pressure regulator within the enclosure, a heat exchanger communicating with the enclosure, and having communication with an exhaust manifold of the power unit, means controlled by the regulator for the last named communication, a valve included in the last named means, a lifter cam operating the valve, means for regulating the communication between the container and the nozzle, a driving connection between the governor controlled valve and the governor and a valved air inlet means connected with the chamber.

STANLEY PELC.

REFERENCES CITED

The following references are of record in the file of this patent:

UNITED STATES PATENTS

| Number | Name | Date |
|---|---|---|
| 911,345 | Tait et al. | Feb. 2, 1909 |
| 1,136,715 | Pitts | Apr. 20, 1915 |
| 1,263,735 | Bolton | Apr. 23, 1918 |
| 1,377,535 | White | May 10, 1921 |
| 1,640,790 | McClain | Aug. 30, 1927 |
| 1,652,122 | Horning | Dec. 6, 1927 |
| 2,023,024 | Kittell | Dec. 3, 1935 |

FOREIGN PATENTS

| Number | Country | Date |
|---|---|---|
| 818,049 | France | June 7, 1937 |